Figure 3:
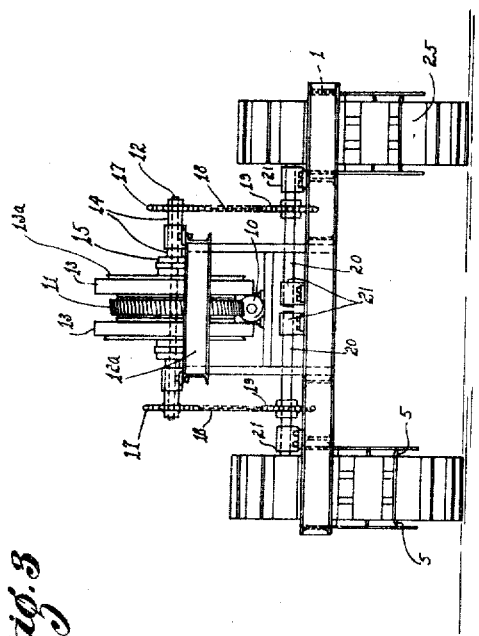

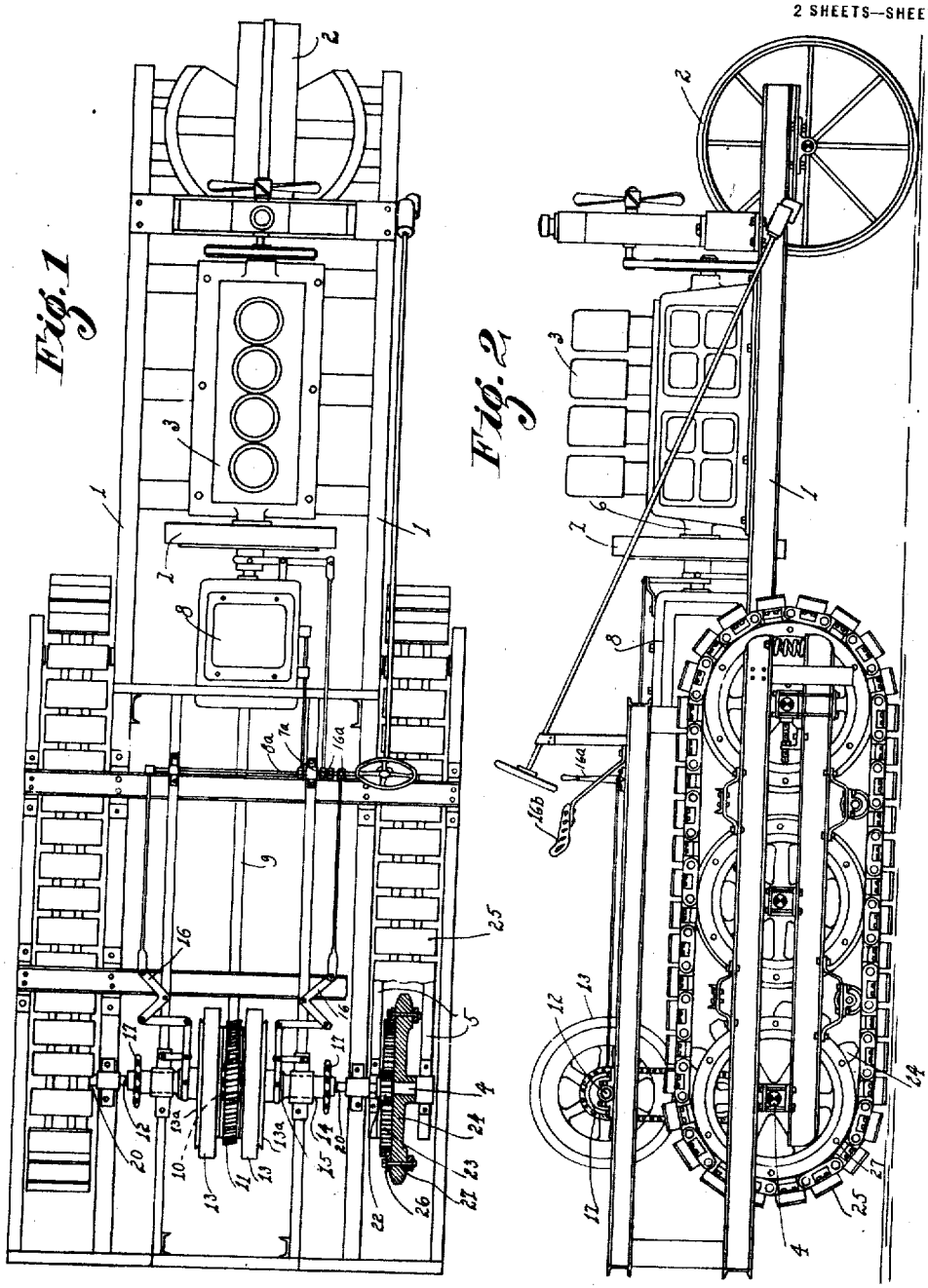

A. R. WHEAT.
DRIVE MECHANISM FOR TRACTORS.
APPLICATION FILED OCT. 11, 1915.

1,202,935.

Patented Oct. 31, 1916
2 SHEETS—SHEET 2.

WITNESS:
Floyd M. Blanchard

INVENTOR.
Alexander R. Wheat
BY
ATTORNEY.

UNITED STATES PATENT OFFICE.

ALEXANDER R. WHEAT, OF STOCKTON, CALIFORNIA.

DRIVE MECHANISM FOR TRACTORS.

1,202,935.   Specification of Letters Patent.   Patented Oct. 31, 1916.

Application filed October 11, 1915. Serial No. 55,187.

*To all whom it may concern:*

Be it known that I, ALEXANDER R. WHEAT, a citizen of the United States, residing at Stockton, in the county of San Joaquin, State of California, have invented certain new and useful Improvements in Drive Mechanism for Tractors; and I do declare the following to be a clear, full, and exact description of the same, reference being had to the accompanying drawings, and to the characters of reference marked thereon, which form a part of this application.

This invention relates to improvements in power tractors and particularly to that class commonly known as platform wheel tractors, the object of the invention being to produce an improved driving mechanism for the tractor which may be able to exert a maximum driving power upon the platform wheels with the minimum expense of power and at the same time be so constructed and operated as to allow of the ready turning, stopping and braking of the tractor in an easy and efficient manner.

A further object of the invention is to provide a major drive wheel for the platform wheel structure whereby an interchange of parts may readily be made when the same are worn.

A still further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claim.

On the drawings similar characters of reference indicate corresponding parts in the several views.

Figure 1 is a top plan view, partly broken out in section, of my improved structure. Fig. 2 is a side elevation of the same. Fig. 3 is a rear view of the same.

Referring now more particularly to the characters of reference on the drawings, the numeral 1 designates the main frame of the vehicle provided with the usual front steering wheel 2 and motor 3, together with all necessary auxiliary structure to be used in connection therewith.

Disposed near the rear of the frame 1 is a cross axle 4 pivotally mounted on each end of which is an auxiliary frame 5, which frames 5 carry the platform wheel structure.

The numeral 6 designates the driving shaft from the motor 3 which is provided with a clutch 7 operating through any suitable transmission mechanism 8 for the purpose of driving the driven shaft 9 at different speeds, as may be desired. On the rear end of the driven shaft 9 is a worm gear 10 which intermeshes with a pinion 11 turnable on a shaft 12 journaled on a frame 12ª elevated above the rear of the frame. On each side of the pinion 11 is secured a female portion 13 of a frictional clutch structure which may be of any desired or suitable type, no especial claim being made to the form of clutch.

On each end of the shaft 12 is a turnable sleeve 14, each provided with a sliding collar 15 keyed thereto and operated by means of a suitable lever mechanism 16. On each collar 15 is a male member 13ª engageable with the members 13 to make a frictional connection between the pinion 11 and the sleeves 14 whereby each or both may be driven with the action of the pinion 11.

On the outer ends of the sleeves 14 are sprockets 17 connected by chains 18 with sprockets 19 on shafts 20 suitably journaled in bearings 21 mounted on the main frame of the tractor.

On the outer end of each shaft 20 is a pinion gear 22, which pinions engage internal pinions 23 secured to the drive wheels 24 of the endless platform wheel structure 25. The said pinions 23 are removably secured to the drive wheels 24 by means of outwardly extending flanges 26 removably bolted by bolts 27 to the said wheels 24 so that when wear occurs the said pinions 23 may be readily taken off and replaced. The endless platform wheel structure 25 is independent invention and has been filed upon separately by me, hence no detailed description of the same is here entered into, this invention relating solely to the drive mechanism.

The lever mechanism 16 can be readily operated by levers 16ª mounted near the driver seat 16ᵇ and also by means of another similar lever and connection 7ª the clutch 7 may be operated to connect or disconnect the drive of the engine, and by a still further lever 8ª and its connections, the transmission mechanism 8 may be operated in the usual manner.

The advantages claimed for my particular form of drive mechanism, are: that a very powerful drive can be delivered to the platform wheels, and at the same time, by the use of the independent clutches 13—13ª, one platform wheel or the other may be turned alone thus allowing of an ease in turning the tractor in one direction or the other. Further, by the specific arrangement of the drive means on the elevated supporting structure, a neat and compact form of drive is provided, while the intermediate sleeve or chain connections give the proper degree of speed control.

From the foregoing description it will be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention what I claim as new and useful and desire to secure by Letters Patent is:

A drive mechanism for a tractor comprising the combination with a tractor having a motor and a driven shaft, of a worm gear on the driven shaft, another shaft, a pinion turnable on said shaft and engageable with the worm gear, a pair of friction clutch members secured to said pinion, a pair of sleeves turnable on said last named shaft and having a sliding clutch mechanism for engagement with the clutch members on the pinion, a gear on each sleeve, a pair of shafts, a gear on each shaft, means connecting each of said gears with one of the gears on said sleeves, a pinion on each of the last named shafts, pinions on the drive wheels of the tractor, said last named pinions engageable with the pinions on said drive wheels, as described.

In testimony whereof I affix my signature.

ALEXANDER R. WHEAT.